(No Model.)
T. H. HERNDON.
WEIGHING SCALE.
No. 396,569. Patented Jan. 22, 1889.
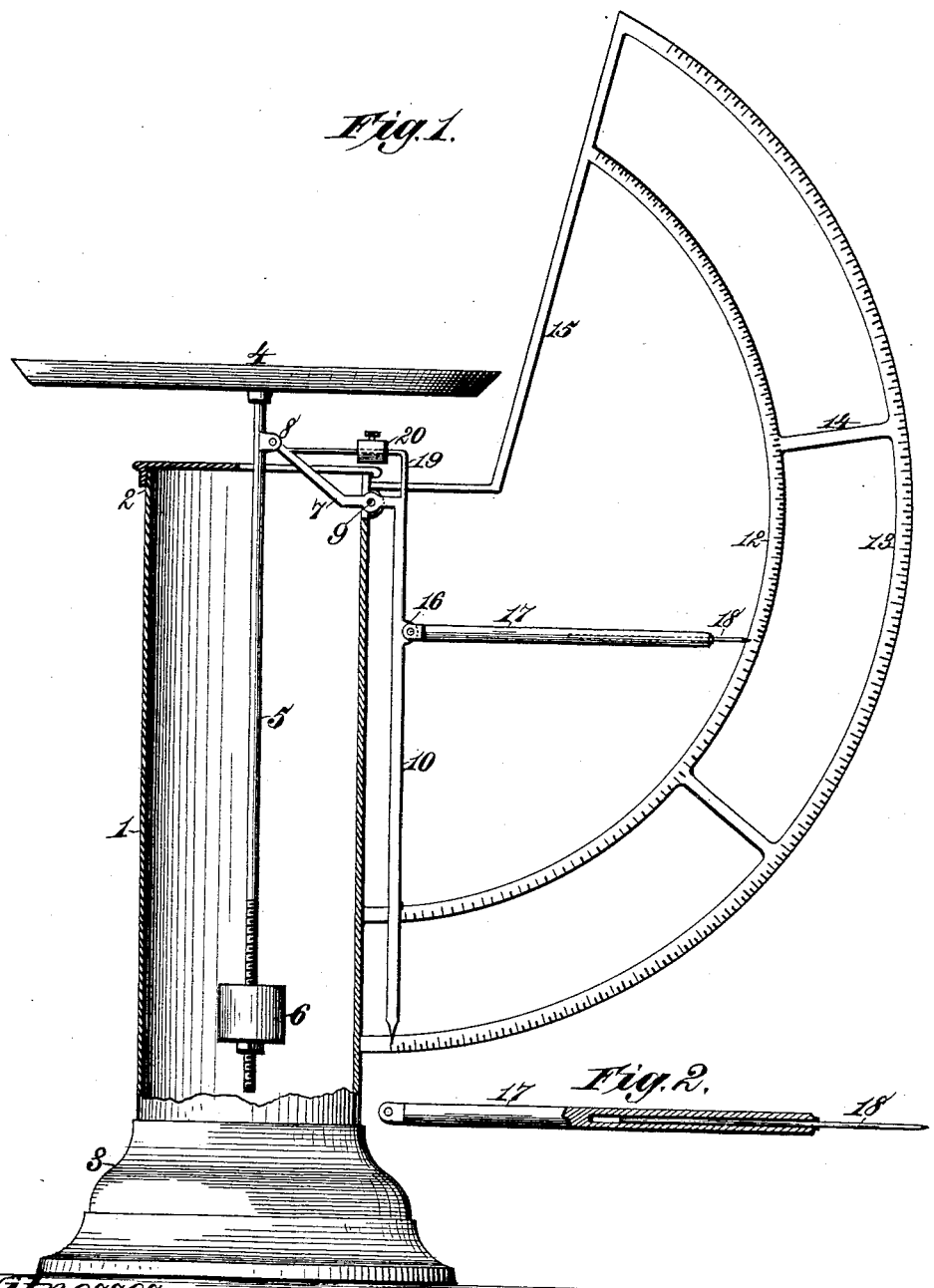

UNITED STATES PATENT OFFICE.

THOMAS H. HERNDON, OF BIRMINGHAM, ALABAMA.

WEIGHING-SCALE.

SPECIFICATION forming part of Letters Patent No. 396,569, dated January 22, 1889.

Application filed October 9, 1888. Serial No. 287,664. (No model.)

*To all whom it may concern:*

Be it known that I, THOMAS H. HERNDON, a citizen of the United States, residing at Birmingham, in the county of Jefferson and State of Alabama, have invented new and useful Improvements in Weighing-Scales, of which the following is a specification.

My invention relates to that class of scales in which the weight is indicated by a pointer or index moving upon a graduated arc, and the purpose thereof is to provide a simple and convenient construction and organization of parts whereby the scale-pan may be mounted upon a vertically-moving spindle, from which the indicating adjustment is communicated to the index.

The invention consists in the several novel features of construction and new combinations of parts hereinafter fully set forth, and then definitely pointed out in the claims following this specification.

Referring to the accompanying drawings, Figure 1 is a side elevation, partly in section, showing my invention. Fig. 2 is a detail section showing the construction of the index.

In the said drawings, the reference-numeral 1 designates a cylindrical casing formed of sheet metal or other material, and separated into two parts which are united by a screw-thread at or near the point 2. The casing is supported upon an expanded case, 3, of any suitable form. The scale-pan 4 is mounted upon the end of a vertical spindle, 5, which descends through a central opening in the top of the casing, and carries a weight, 6, at its lower end.

Upon the upper part of the frame or casing 1 is pivotally mounted an arm, 7, having its end pivotally connected to a lug, 8, on the spindle 5. This arm extends somewhat beyond or outside the pivotal point or fulcrum 9, and is then turned at, or nearly at, a right angle, and extended downward, forming a pointer or index, 10, which is substantially parallel with the axis of the cylindrical casing 1. Upon said casing 1 is rigidly mounted a duplex arc-shaped plate consisting of the two parallel plates 12 and 13, both curved from the same central point, 9. These plates are braced by pieces 14, and their upper ends are united by a bar, 15, which is also extended and connected to the casing.

Upon the index 10 is formed a lug, 16, to which is pivotally attached an index, 17, within the free end of which is placed an extensible needle or pointer, 18, which may be drawn out far enough to move upon either the inner plate, 12, or outer arc, 13. Its pivotal connection to the lug 16 is such that the index 17 may be turned down into parallelism with the arm 10.

Upon the arm 7 is rigidly mounted an arm, 19, on which is an adjustable counterbalancing-weight, 20, which may be so moved as to compensate for the adjustment of the index 17 upon its pivotal point. When said index is extended, the weight is adjusted toward the spindle 5; but when it is turned into parallelism with the arm 10, then the counter-balance 20 is adjusted in the opposite direction or away from the spindle 5.

When weight is placed upon one side of the scale-pan, the balancing-weight 6 swings slightly to one side in order to compensate for the center of gravity being upon the opposite side of the center of the scale-pan. The pan at once sinks, operating the arm 10, and the weight is indicated upon the inner arc-plate, 12. If the weight is more than usual, the extensible needle 18 is drawn out to give the indications of the outer arc-plate, 13.

The plates 12 and 13 are each graduated to give the necessary indications of weight of any article placed upon the scale.

By this invention a neat and compact weighing-scale is provided, and for letters and packages of comparatively light weight it is wholly automatic and very convenient.

The weight 6 may be screwed on the spindle 5 or held by a nut, by which it may, if desired, be adjusted vertically.

What I claim is—

1. In a scale, the combination, with a cylindrical casing, of a central spindle having a weight at its lower end and a scale-pan at the upper end, an arm or index fulcrumed on the casing and pivotally connected to the spindle, said arm being bent beyond its fulcrum and extended down vertically to give indications on a curved graduated plate, and an auxiliary index pivotally mounted on said arm and having an extensible needle indicating the graduations of the curved plate or of an outer parallel plate, substantially as specified.

2. In a scale, the combination, with a cylindrical casing, of a central spindle carrying the pan and having a weight at its lower end, an arm pivotally connected to the spindle, fulcrumed on the casing and bent beyond the fulcrum vertically downward, an auxiliary arm or index pivotally mounted on said arm and having an extensible needle, an auxiliary or counterbalancing weight moving upon an arm rigidly mounted on the arm pivoted to the spindle, and two graduated arc-shaped plates having their center at the fulcrum of said arm and rigidly mounted on the casing, substantially as specified.

In testimony whereof I have affixed my signature in presence of two witnesses.

THOMAS H. HERNDON.

Witnesses:
P. L. HERNDON,
E. C. HERNDON.